(12) United States Patent
Jones et al.

(10) Patent No.: US 10,616,211 B2
(45) Date of Patent: Apr. 7, 2020

(54) SYSTEM AND METHOD FOR AUTHENTICATING CLIENTS

(71) Applicant: CISCO TECHNOLOGY, INC., San Jose, CA (US)

(72) Inventors: Von Jones, Sugar Land, TX (US); Girish Rathnamani Ranganathan, Ontario (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 64 days.

(21) Appl. No.: 15/486,009

(22) Filed: Apr. 12, 2017

(65) Prior Publication Data

US 2018/0302391 A1    Oct. 18, 2018

(51) Int. Cl.
| | |
|---|---|
| *H04L 29/06* | (2006.01) |
| *G06F 17/30* | (2006.01) |
| *G06F 16/28* | (2019.01) |
| *G06F 16/951* | (2019.01) |
| *G06F 8/61* | (2018.01) |

(52) U.S. Cl.
CPC .......... *H04L 63/083* (2013.01); *G06F 16/284* (2019.01); *G06F 16/951* (2019.01); *G06F 8/61* (2013.01)

(58) Field of Classification Search
CPC ... H04L 63/083; G06F 8/61; G06F 17/30595; G06F 17/30864; G06F 16/951; G06F 16/284
See application file for complete search history.

(56) References Cited

U.S. PATENT DOCUMENTS

| | | | | |
|---|---|---|---|---|
| 2004/0221045 | A1* | 11/2004 | Joosten | G06F 21/33 709/227 |
| 2006/0165069 | A1* | 7/2006 | Maurice | H04L 63/10 370/352 |
| 2010/0242037 | A1* | 9/2010 | Xie | G06F 8/61 717/178 |
| 2013/0046869 | A1* | 2/2013 | Jenkins | H04L 67/22 709/223 |
| 2017/0329957 | A1* | 11/2017 | Vepa | G06F 21/445 |

* cited by examiner

*Primary Examiner* — Meng Li
(74) *Attorney, Agent, or Firm* — Polsinelli PC

(57) ABSTRACT

A system is disclosed for authenticating a client's request for resources in a network environment. The system is configured to receive a request, the request comprising credentials and an API scope, authenticate the credentials, and confirm the API scope of the request is identified in one or more API scopes allocated to a client using an authorization server. The authorization server may comprise a relational database correlating one or more clients with one or more roles, the roles may be correlated with one or more permissions, and the permissions may be correlated with one or more API scopes. The system may be configured to request an access token, the access token comprising an API scope that correlates to the API scope of the request, and grant access to the requested resource if the API scope of the access token correlates to the API scope of the request.

20 Claims, 6 Drawing Sheets

200B

SYSTEM AND METHOD FOR AUTHENTICATING CLIENTS

TECHNICAL FIELD

This present disclosure relates generally to systems and methods for authenticating clients, and more particularly to authenticating requests for resources based on a client's allocated role and API scope.

BACKGROUND

With the proliferation of network-based applications, there are often many services running over different network protocols that need to appear as a coherent set of products and/or services to customers and partners, while also providing the developer community with a standard set of services to use as a platform. A primary challenge is obtaining a centralized identity service so that there is a single authentication mechanism that works across all of the sub-services to not only identify a user, but to also determine which, if any, services the user is authorized to access, which permissions the user is granted, and what application program interface ("API") scopes the user may utilize.

Some authorization systems utilize role based-access control schemes that affiliate a user's identity with one or more roles and permissions to control the service the user or client is entitled to use. Role-based access control systems, however, may not be capable of providing fine-grained control over which user can use a specific feature of a service or limit users to specific API calls. Rather, role-based access control systems typically use groups or roles to assign similar permissions to sets of users without the ability to limit or otherwise control scopes on an API level.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
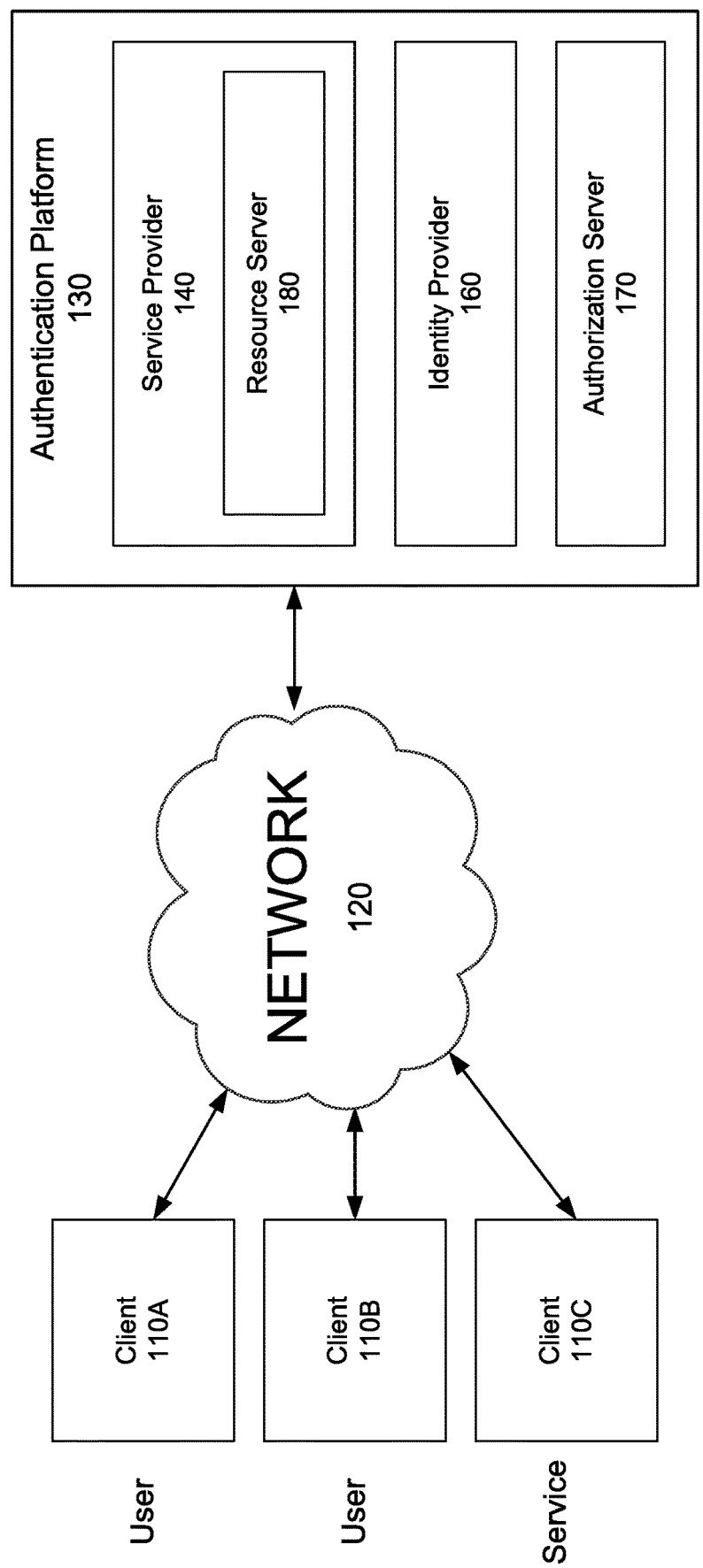
FIG. 1 is a conceptual block diagram illustrating an example network environment utilizing an authentication platform, in accordance with various aspects of the subject technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Network-based applications running over one or more networks occasionally utilize role-based access control lists to authenticate users and grant them access or permission to particular features of a service. Such access may include read or write functionality, onboarding new users, ability to modify software settings, or access to other application features that an administrator may wish to limit or restrict between sets of users. These authorization systems utilize role based-access control schemes that affiliate a user's identity with one or more roles and permissions to control the service the user is entitled to use. Role-based access control ("RBAC") systems, however, may not be capable of providing fine-grained control over which user can use a specific feature of a service or be capable of providing the necessary control scopes at an API level. Rather, role-based access control systems typically use groups or roles to assign similar permissions to sets of users and do not control or otherwise limit API level access of resources. In addition, RBAC authorization systems rely on a user name and password or secret, and do not allow a user to access certain restricted or secured resources on an API level that have been secured using OAUTH scopes without requiring a secondary login or authentication request to obtain a valid access token.

Access tokens may be obtained through use of authentication protocols, such as "OAuth." The OAuth protocol may be used to authorize a third party application access to an API resource or application without sharing a user or client's credentials. OAuth provides secure access to server resources on behalf of a user. OAuth may also allow the issuance of access tokens to third party applications or services using an authorization server, with approval of the access token delegated to the authorization server. Third party applications or services with a valid and authenticated access token, may then gain access to secured resources from a server.

Many applications or services may utilize the RBAC and OAuth schemes in isolation, with network-based applications typically implementing a single protocol scheme. If an application or service utilizes both schemes, independent sets of checks requiring separate login or authentication events are required. Requiring multiple login events or authorization routines renders applications and services to be more complex, and requires developers, such as microservice developers, to be substantially familiar with both sets of technologies and authorization protocols or otherwise risk the creation of possible security gaps should a developer not be sufficiently trained on both technologies and protocols. Further, in a SaaS-based microservice architecture, customers want both simple, easy to use applications, and a rich API set which can be used for integration.

The disclosed technology addresses the need in the art for providing an authentication platform that is capable of utilizing more than one authentication protocol, such as both RBAC and OAuth, to control access to application features and to request and verify access tokens for access to application resources and API calls using a reduced number of authorization checks.

DETAILED DESCRIPTION

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

FIG. 1 illustrates a conceptual block diagram illustrating an example network environment 100 utilizing an authentication platform 130, in accordance with various aspects of the subject technology. Various aspects are discussed with respect to a general wide area network 120 for illustrative purposes, however, these aspects and others may be applied to other types of networks. For example, the network environment 100 may be implemented by any type of network 120 and may include, for example, any one or more of an enterprise private network (EPN), cellular network, a satellite network, a personal area network (PAN), a local area network (LAN), a broadband network (BBN), the Internet, and the like. The network 120 in the network environment 100 can be a public network, a private network, or a combination thereof. The network environment 100 may be implemented using any number of communications links associated with one or more service providers, including one or more wired communication links, one or more wireless communication links, or any combination thereof. Additionally, the network environment 100 can be configured to support the transmission of data formatted using any number of protocols.

The network environment 100 includes one or more clients 110, with client 110A and 110B each having a respective user, and client 110C comprising a service. A user may be a person, or another computing apparatus. The clients 110 may include machines (e.g., servers, personal computers, laptops), virtual machines, containers, mobile devices (e.g., tablets or smart phones), smart devices (e.g., set top boxes, smart appliances, smart televisions, internet-of-things devices), or network equipment, servers, containers, among other computing devices.

Each client 110 is configured to communicate with the authentication platform 130 via the network 120. For example, the clients 110A-B may utilize software applications, browsers, or computer programs that are running on a device such as a desktop computer, laptop computer, tablet computer, server computer, smartphone, or any other apparatus on which an application (e.g., client application) is running that at some point in time, involves a user accessing a service provided by a service provider 140. In one aspect, the clients 110A-C may operate pursuant to the port control protocol (PCP) to control how data (e.g., packets) are handled to provide for the data flow of content to the clients 110A-C. Other protocols for provisioning data flow to the clients 110A-C by the network 120 may also be used.

The authentication platform 130 includes a service provider 140, an identity provider 160, an authorization server 170 and a resource server 180. In other aspects, the authentication platform 130 may include additional components, fewer components, or alternative components, such as additional service providers, additional authorization servers, different networks for different clients, and/or additional third-party servers. The network 120 may include additional components, such as routers, firewalls, or servers. The authentication platform 130 may be implemented as a single machine or distributed across a number of machines in the network, and may comprise one or more servers.

The network devices (e.g., clients 110, service provider 140, identity provider 160, authorization server 170, resource server 180) may be connected over links through ports. Any number of ports and links may be used. The ports and links may use the same or different media for communications. Wireless, microwave, wired, Ethernet, digital subscriber lines (DSL), telephone lines, T1 lines, T3 lines, satellite, fiber optics, cable and/or other links may be used.

According to the subject technology disclosed herein, the service provider 140 may be configured to provide software services to one or more clients 110A-C. For example, the service provider 140 may host one or more Software-as-a-Service (SaaS) applications. In some aspects, there may be multiple service providers 140, each of which hosts one or more SaaS applications. The service provider 140 may also have access to one or more physical and/or virtual resource servers 180 that are configured to provide software services and resources to clients 110A-C. The resource server 180 need not be co-located and need not be completely under control of the service provider 140.

Each of the clients 110A-C may be configured to communicate with the service provider 140 to request access to applications or services provided by the service provider 140 and resources from the resource server 180. The request may include a resource identifier in a header field, such as "Resource_ID," or alternatively, resources may be included in a URL. If a request for access does not include credentials, the service provider 140 may process a request for access by first requiring the client 110 to submit credentials that includes information identifying a user. If the client 110 responds to a request for credentials by submitting credentials, such as a user name or user's enterprise identity and password or secret, the service provider 140 may forward the credentials to the identity provider 160 and/or the authorization server 170 for validation, as discussed below.

The identity provider 160 may comprise a system or entity that validates credentials. Before taking any action, clients 110 are registered in the identity provider 160 and given credentials, such as a username, client identifier, password or secret. A client 110 that comprises a service (e.g., client 110C of FIG. 1), may be further allocated one or more API scopes, as described further below. The credential and API scope records stored within the identity provider 160 may be stored in a database. The database may be a conventional relational database, other embodiments however, may utilize other types of databases (e.g., NoSQL, NewSQL, etc.). In some aspects, the identity provider 160 may be further configured to generate access tokens for service clients 110C. The identity provider 160 may comprise servers, routers, switches, or other network devices for validating credentials and generating access tokens for service clients 110C.

The identity provider 160 contains records of user and client 110 credentials and is configured to validate, or alternatively reject, credentials submitted by the service provider 140. If the credentials submitted by the client 110 are validated by the identity provider 160, the identity provider 160 transmits the validation response to the service provider 140. The service provider 140 may then relay validation to the client 110 via a message window or through some other user interface indicating that the submitted credentials were accepted and validated. If the submitted credentials do not match a record stored within the identity provider 160, a message is returned to the service provider 140 indicating that the credentials are invalid.

Figure 2A:
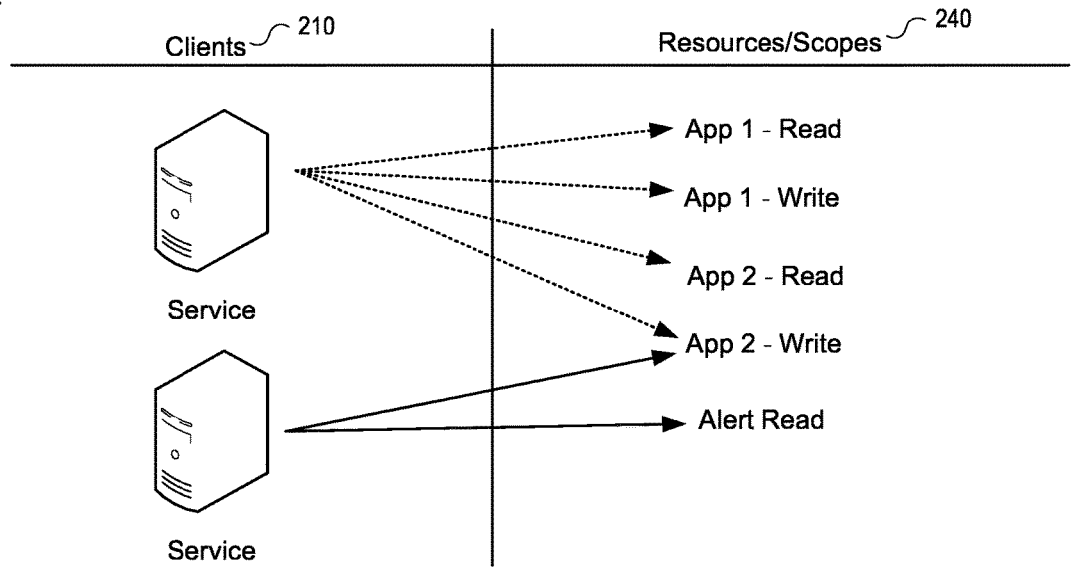
FIGS. 2A and 2B depict example tables allocating scopes to clients, in accordance with various aspects of the subject technology.

Referring to FIG. 2A, an example table 200A is shown visualizing relationships between credentials and one or more API scopes stored within the identity provider 160. In some aspects, for a client 210 comprising a service, API scopes 240 may be directly allocated to the service. For example, a first service may be allocated API scopes for reading and writing data associated with a first application, as well as reading and writing data associated with a second application. A second service may be allocated API scopes for writing data associated with the second application and reading alerts.

Referring back to FIG. 1, a request from a client 110 to the service provider 140 may include credentials and a request for an API level operation (e.g., read, create, update, delete or write functionality of data associated with an application, writing policy, etc.). To ascertain whether the client 110 has the right to perform the API level operation, the identity provider 160 may first query records stored in its database to determine whether the credentials from the client 110 are valid. If the client 110 is a service, the identity provider 160 may further query records stored within its database to determine whether the requested API scope is identified in the one or more API scopes allocated to the service. If the client 110 is a user, the authorization server 170 may be utilized to determine whether the requested API scope is identified in the one or more API scopes allocated to the user, as described below.

The authorization server 170 may be configured to map API scopes to particular clients 110 or users based on their roles (e.g., administrators, customers, or users) and permissions (e.g., rules limiting application installation, application configuration, or adding users based on a particular role). The API scopes may be stored in a particular format, such as "service name>:<scope_name>".

Referring to FIG. 2, an example table 200B is shown visualizing API scopes 240 allocated to clients 210. In some aspects, for a client 210 comprising a user, API scopes 240 are allocated to the user based on the user's role 220 and permission 230. Users 210 may have one or more roles 220 assigned to them, with each role 220 having one or more permissions 230 assigned to a particular role 220 to control the service the user 210 is entitled to use. For example, a user assigned to an Enterprise Admin role may have the right to install an agent and configure network policies. A user assigned to an Application Admin role may have the right to install an agent, configure network policies, view alerts, assess network availability, configure applications and bring new users onboard. A user assigned to a Read-only role may only have the right to view alerts and assess network availability.

Permissions 230 are further mapped to API level resources or scopes 240. For example, an Agent Installation permission may be further mapped to grant the user API scopes for reading and writing data associated with a first application, reading and writing data associated with a second application, and reading alerts. A Policy Configuration permission may be mapped to grant the user API scopes for reading and writing data associated with the second application, reading alerts, and writing policies. A View Alerts permission may be further mapped to grant the user API scopes for reading data associated with the second application and reading alerts. A Configure App permission may be further mapped to grant the user API scopes for writing data associated with the second application. The Onboard Users permission may be further mapped to grant the user API scopes for adding users.

Figure 2B:
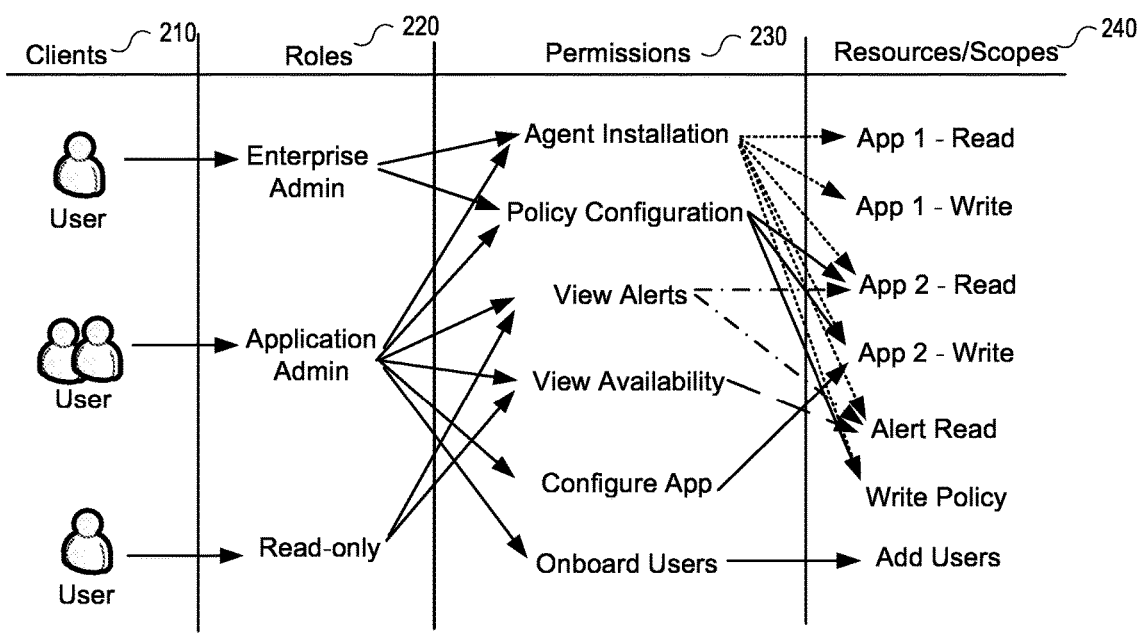

Referring back to FIG. 1, an API level request for a resource from a particular client 110C comprising a service may be validated against the API scopes allocated to that particular client 110C by the identity provider 160 (as shown in FIG. 2A), and an API level request for a resource from a particular client 110A-B comprising a user may be validated against the API scopes allocated to that particular client 110A-B by the authorization server 170 (as shown in FIG. 2B). If the service provider 140 receives an indication from the identity provider 160 that the credentials from the client 110 are valid, and in the case of a service client 110C that the request for the API level resource falls within the permitted API scopes for that client 110C, the service provider 140 may request an access token from the authorization server 170.

Figure 3:
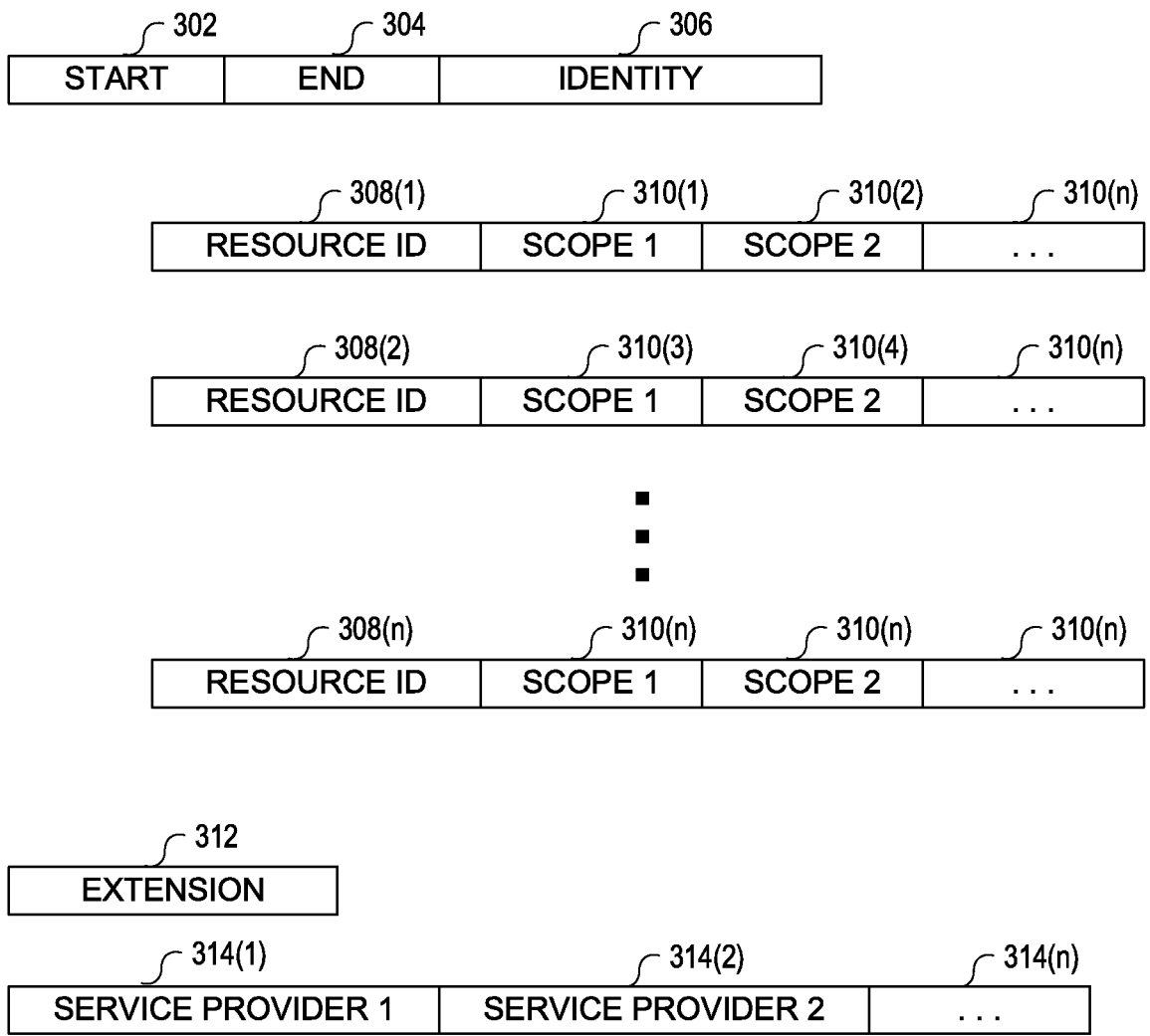
FIG. 3 depicts an exemplary access token, in accordance with various aspects of the subject technology.

The authorization server 170 may comprise servers, routers, switches, or other network devices for generating and authenticating access tokens. Referring to FIG. 3, an access token 300 may be a time-limited list of API scopes that entitles the bearer to access a list of discrete resources or services from the resource server 180. The access token may include data indicating time validity specifying the time period during which the access token is valid such as a start and end field, 302 and 304 respectively, an identity field 306 that identifies the user or client 110 for which the access token is intended, a resource identifier field 308 (such as an application identifier) that identifies the application to which a given user or client 110 may have access, and a scope field 310 which indicates the allowed API scopes for the corresponding resource. In some aspects, the scopes in the scope field 310 may be limited to only the scope necessary for a given resource request. The scope field 310 may further specify a rule associated with the requested resource, such as allow, deny, or other rules, such as delegate.

The start field 302 may comprise data representing a start time and/or date, after which, the access token 300 is valid. The end field 304 may comprise data representing an expiration time and/or date, after which, the access token is no longer valid. The identity field 306 may comprise data, such as a client identifier, user name, or other user or client data for identifying a particular client 110.

In one aspect, each access token 300 may include one or more API scopes for one or more resources, identifying API scopes that may be allocated to a particular client. For example, an access token 300 may comprise a first resource identifier field 308(1) for identifying a first application or resource to which a given client 110 may request access, and a second resource identifier field 308(2) for identifying a second application or resource to which a given client 110 may request access.

Each resource identifier field 308(n) may include one or more API scope fields 310(n) representing API scopes allocated to a particular client, as required to fulfill a request for a resource. For example, a request from a client to read and write data in a first application and read alerts and write policy in a second application may result in an access token 300 having a first resource identifier field 308(1) identifying the first application, with a first scope field 310(1) allowing reading of data for the first application, and a second scope field 310(2) allowing writing of data for the first application. In this example, the access token 300 may further include a second resource identifier field 308(2) identifying the second application, with a third scope field 310(3) allowing reading of alerts of the second application, and a fourth scope field 310(4) allowing writing of policy for the second application.

The access token 300 may include additional scope fields 310(n) for each respective resource identifier field 308(n) as necessary to grant or fulfill the request from the client.

The access token may also be usable on/by a plurality of service providers 140. For example, the access token 300 may further include a service provider field 314 to indicate on which one or more service providers the access token may be used. For example, the access token 300 may identify a first service provider by using a first service provider field 314(1) and a second service provider by using a second service provider field 314(2). The access token 300 may identify additional service providers by using additional service provider fields 314(n), to allow the access token 300 to be used by additional service providers.

The access token 300 may further include an extension field 312 that may contain additional data provided by a service provider upon provisioning, such as inputs to other more complicated authorization schemes.

Referring back to FIG. 1, the authorization server 170 may receive a request from the service provider 140 for an access token. In response, the authorization server 170 may generate an access token and return the access token to the service provider 140. In the case of a service client 110C, the authorization server 170 may forward the request for the access token from the service provider 140 to the identity provider 160, which may then generate the access token for the service client 110C. The access token for the service client 110C may then be returned to the authorization server 180 by the identity provider 160. The authorization server 170 may then return the access token for the service client 110C to the service provider 140.

The service provider 140 may then forward the access token to the client 110 for use in requesting the desired resource from the resource server 180. The client 110 may then submit the access token to the service provider 140 to request the desired resource from the resource server 180. In some aspects, the access token 300 may be transmitted from the client 110 to the service provider 140 as a parameter in a header field. For example, if the header field is titled "Authorization," the access token parameter may be "Authorization: Bearer<access_token>".

The resource server 180 offers resources that may represent a concrete, self-contained piece of functionality that is the smallest unit of authorization. The resource server 180 may comprise servers, routers, switches, or other network devices for providing resources. Upon receiving the access token from the service provider 140, the resource server 180 may communicate with the authorization server 170 to validate that the access token contains the scope validated for access to that resource. The authorization server 170 will process the access token to determine whether the scope is contained in the token for that particular user or client 110. If validated, the authorization server 170 will return a validation result to the resource server 180 indicating that the requested resource is within the one or more scopes identified in the access token. In response to the validation result, the resource server 180 may return the requested resource to the service provider 140. If the authorization server 170 returns an invalid response indicating that the access token is invalid, then the resource server 180 returns an error message to the service provider 140 indicating that access is denied.

If the service provider 140 receives a successful validation response for the requested resource from the resource server 180, then the service provider 140 returns a service response to the client 110. If the service provider 140 receives an error message from the resource server 180, then the service provider 140 returns an error message to the client 110.

In some aspects, each separate request for an API level operation (e.g., read or write functionality of data associated with an application, writing policy, etc.) may require authentication and validation from the identity provider 160 and an access token from the authorization server 170.

According to the authentication platform 130 described above, the client 110 may make a request for a resource on an API level to the service provider 140, the service provider 140 may request credentials and upon submission, transmit the credentials to the identity provider 160 for validation. The identity provider 160 will return a validation response if the credentials are valid and in the case of a service client 110C, that the request is allowed under the scopes assigned to that service client 110C. The service provider 140 may then request an access token from the authorization server 170. In response, the authorization server 170 may generate the access token or in the case of a service client 110C, request the access token from the identity provider 160. The access token may include the authorized scope allocated to the client 110. The access token is then transmitted to the service provider 140. The service provider 140 may then send the access token to the client 110, which may then use it to request access to the requested resource from the resource server 180. The resource server 180 will validate the access token by requesting the authorization server 170 to validate the access token. If the access token is validated, the resource server 180 will provide the requested resource to the service provider 140.

The various components of the network environment 100 are configured by hardware and/or software to request services, authenticate users, request access tokens, provide access tokens, validate access tokens, authorize access tokens, return resources and/or combinations thereof. Logic is encoded in one or more non-transitory computer-readable media for operating the clients 110A-C, the components of the service provider 140, identity provider 160, authorization server 170, and resource server 180. The logic includes code for execution by a processor or processors. When executed by a processor, the code is used to perform operations for requesting services from the service provider 140, authenticate users via the identity provider 160, provide, validate and authorize access tokens via the authorization server 170, and return resources via the resource server 180.

Figure 4:
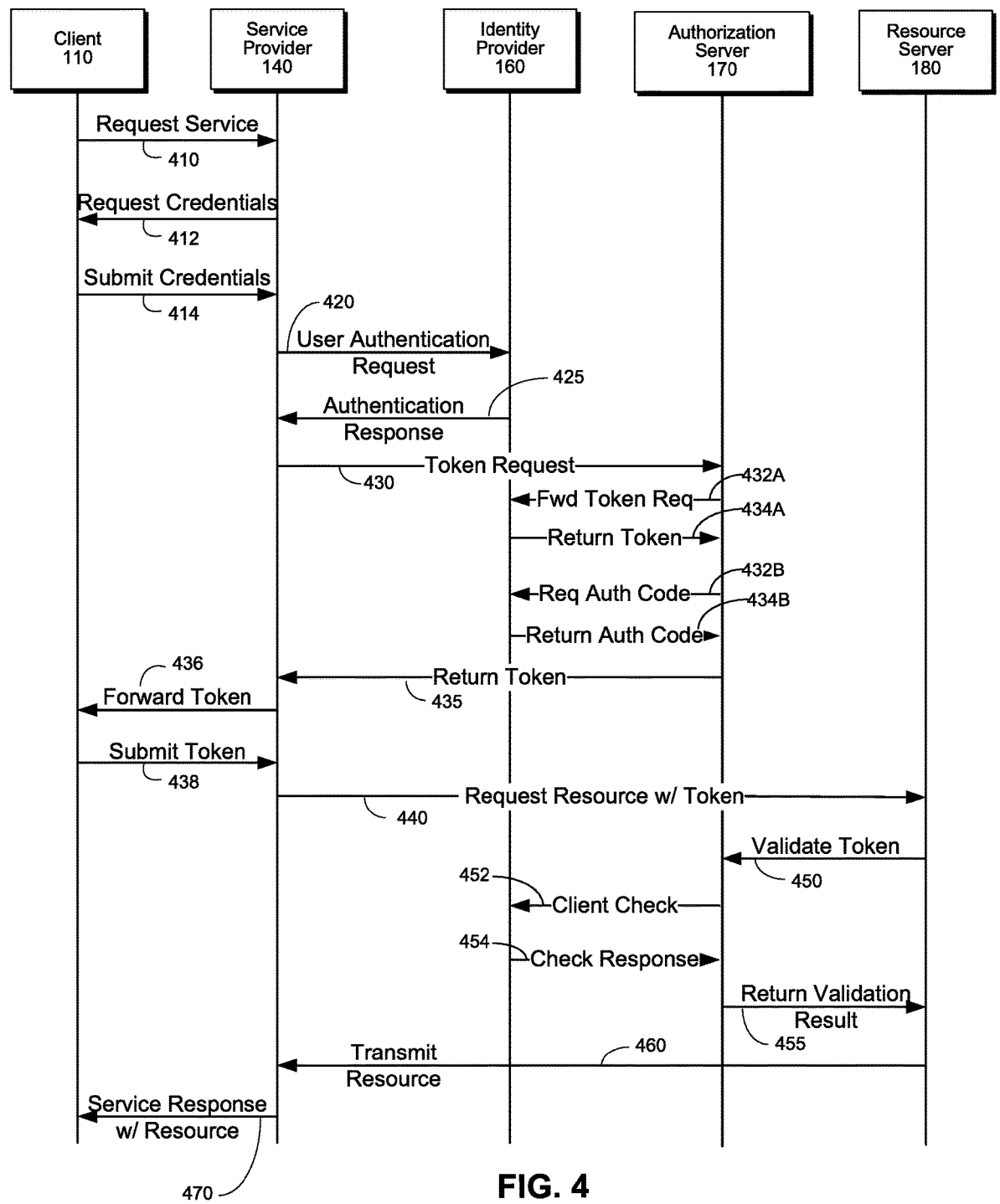
FIG. 4 depicts a sequence diagram showing the communications between a client, service provider, identity provider, authorization server and a resource server, in accordance with various aspects of the subject technology

Referring to FIG. 4, a sequence diagram 400 showing the communications between a client 110, service provider 140, identity provider 160, authorization server 170 and a resource server 180 is illustrated, in accordance with various aspects of the subject technology. The method of FIG. 4 is performed by the devices shown. The client 110 performs acts 410, 414 and 438. The service provider 140, such as a server of the service provider 140, performs acts 412, 420, 430, 436, 440 and 470. The identity provider 160 performs acts 425, 434A, 434B and 454. The authorization server 170 performs acts 432A, 432B, 435, 452 and 455. The resource server 180 performs acts 450 and 460. Other devices may perform any one or more of the acts, such as a different server of the service provider 140. Any of the acts may involve operations by more than one component, such as the validation of the access token in act 450 by the authorization server 170.

Additional, different, or fewer acts may be provided. For example, acts for any one of the devices (e.g., client 110, service provider 140, identity provider 160, authorization server 170, and resource server 180) are performed with or without the other devices performing acts. In yet another example, access token generation, routing, or other networking acts are performed in addition to the acts shown in FIG. 4.

The acts may be performed in the order shown. The order is listed in numerical sequence and/or from top to bottom in FIG. 4. In alternative aspects, the acts may be performed in other orders.

In act 410, a user, application, program or service at the client 110 requests access to a service provided by the service provider 140. The request may include client or user credentials (e.g., client identifier and secret, username and password) and may include a request for a resource at an API level. If the request does not include credentials, in response to the request from the client 110, at act 412, the service provider 140 requests credentials from the client 110. In act 414 the client 110 receives the request for credentials and submits the credentials along with the request for the resource to the service provider 140. In act 420 the service provider 140 receives the credentials and request from the client 110 and transmits the credentials to the identity provider 160 for authentication. The identity provider 160 receives the credentials and request provided by the service provider 140 and confirms that the credentials are valid. If the client 110 is a service, the identity provider 160 also confirms that the request is within the API scopes allocated to the service client 110 using mapping data stored in the identify provider 160 (as described above with reference to FIG. 2A). If the identity provider 160 confirms that the credentials are valid and in the case of a service client, that the request is within the API scopes allocated to the service client 110, then at act 425 the identity provider 160 transmits an authentication response indicating to the service provider 140 that the credentials and request is valid and authenticated.

In act 430, the service provider 140 requests an access token from the authorization server 170 to perform the request. Any access token request process may be used. In one embodiment, the OAuth protocol (e.g., OAuth 2.0) may be used to obtain an access token. In another embodiment, the Kerberos protocol may be used.

In act 432A, if the client 110 is a service, after the authorization server 170 receives the request for the access token from the service provider 140, the authorization server 170 may forward the request for the access token to the identity provider 160. In response, in act 434A, the identity provider 160 may generate an access token and return the generated access token to the authorization server 170. The access token generated by the identity provider includes one or more API scopes allowed by the access token. As described above, the one or more API scopes allocated to the service client 110 are derived from data or records stored at the identity provider 160 (as shown in FIG. 2A).

In act 432B, if client 110 is a user, after the authorization server 170 receives the request for the access token from the service provider 140, the authorization server 170 may communicate with the identity provider 160 to obtain an authorization code that validates the client 110 request and requires generation of the access token within a prescribed period, such as 60 seconds. In act 434B, the identity provider 160 provides the authorization code and transmits the authorization code to the authorization server 170. The authorization server 170 may then confirm using data or records stored at the authorization server (as shown in FIG. 2B) that any API scopes required to satisfy the request are within the API scopes allocated to the client 110 based on roles and permissions allocated to the user. If the request is within the API scopes allocated to the client 110, pursuant to the OAuth protocol or other token protocol, the authorization server 170 generates the access token.

In act 435, the authorization server 170 transmits the access token to the service provider 140 using OAuth procedures. The access token includes API scopes that may be performed by the client 110. In one aspect, the API scopes are limited to only those required by the request. The access token may also be assigned a lifetime requiring use of the access token within a specified time period or the access token is invalid. The authorization server 170 may manage access tokens, such as revoking access tokens after a call or request is terminated.

In act 436, the service provider 140 forwards the access token to the client 110. In act 438, the client 110 submits the access token to the service provider 140 as part of a request service message. In act 440, the service provider 140 uses the access token to request access to the requested resource from the resource server 180. In act 450, the resource server 180, upon receiving the access token, transmits the access token to the authorization server 170. The authorization server 170 validates the access token as received by the resource server 180 using OAuth or other procedures. The timestamp for the access token may be checked. If recent enough, the authorization server 170 verifies that the access token is valid. If the client 110 is a user, the authorization server 170 may also verify and confirm that the API scope included in the access token is within the API scopes allocated to the client 110.

In some aspects, in act 452, the authorization server 170 may communicate with the identity provider 160 to confirm that the client credentials contained in the access token are valid. In act 454 the identity provider 160 responds to the authorization server 170 indicating whether the client credentials are valid. If the client credentials are valid, the authorization server 170 validates the access token.

In act 455 if the access token is successfully validated, the authorization server 170 communicates with the resource server 180 to return a validation response. The resource server 180 uses the access token to authorize access to resources. In one aspect, the resource server 180 may match the returned validation response from the authorization server 170 with the scopes requested in the request sent by the service provider 140. If the authorization sets match, the resource server 180 honors the request. If the authorizations do not match, then the resource server 180 may reject the request. In act 460, the resource server 180 establishes communications with the service provider 140 to provide the requested resource from the resource server 180. In act 470, the requested resource is served to the client 110 by the service provider 140.

Figure 5:
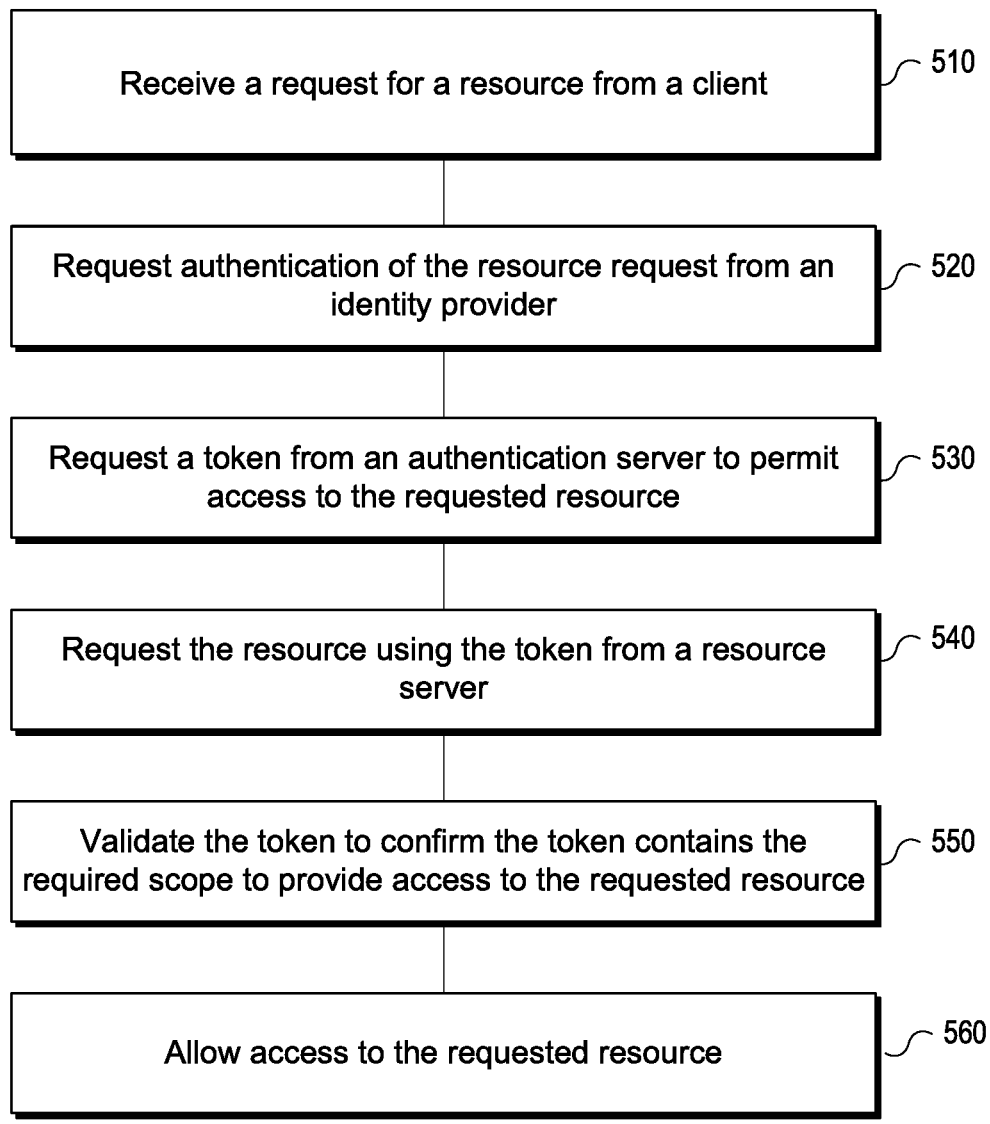
FIG. 5 depicts an example method for providing access to a resource in a network environment, in accordance with various aspects of the subject technology.

FIG. 5 shows an example method 500 for providing access to a resource in a network environment. It should be understood that, for any process discussed herein, there can be additional, fewer, or alternative steps performed in similar or alternative orders, or in parallel, within the scope of the various aspects unless otherwise stated. The process 500 can be performed by a network, and particularly, an authentication system (e.g., the authentication platform 130 of FIG. 1) or similar system.

At operation 510, a request for access to a secure resource may be received from a client. The request may, for example, comprise an API level request to read or write data in an application, write network policies, read alerts associated with network events, or onboarding users. The request may be submitted to a service provider hosting one or more applications for processing. In response to receiving the request for access to the resource, the system may request the client to submit credentials to validate the request.

After receiving the credentials from the client, the service provider may forward the submitted credentials to an identity provider for authentication at operation 520. The credentials may comprise a user name and password. In one aspect, the request to authenticate the credentials may include the API level request submitted by the client. The system may process the request for authentication by confirming that the submitted credentials are valid and confirming that the API request is within the API scopes allocated to the client. For example, the identity provider may include information mapping individual service clients to permitted API scopes, as discussed above with reference to FIG. 2A. In another example, the authorization server may include information mapping individual user clients to permitted API scopes based on the user's roles and permissions, as discussed above with reference to FIG. 2B.

If the credentials and API request are authenticated, at operation 530, the system may request an access token to permit access to the requested resource. The access token may be requested from an authorization server using the OAuth protocol. In one aspect, the access token may be generated by the identity provider if the client is a service. In one aspect, the access token may only allow the API scopes necessary to carry out the request from the client. For example, if a client has the ability to read and write data to an application, but the request is limited to reading data, the access token may only allow reading of data and not include API scopes directed to writing of data.

At operation 540, the system may request access to the resource using the access token. The request to access the resource may be transmitted to a resource server hosting the requested resource. At operation 550, in response to receiving the request for access to the resource, the system may request validation of the access token from the authorization server to ensure the access token contains the required API scopes to satisfy the request and grant access to the requested resource.

If the access token is validated, at operation 560 the resource server may allow access to the requested resource. In some aspects, access to the resource may be limited to the scopes contained in the access token. In other aspects, if the request requires transmission of a resource, the resource may be transmitted to the service provider.

Figure 6:
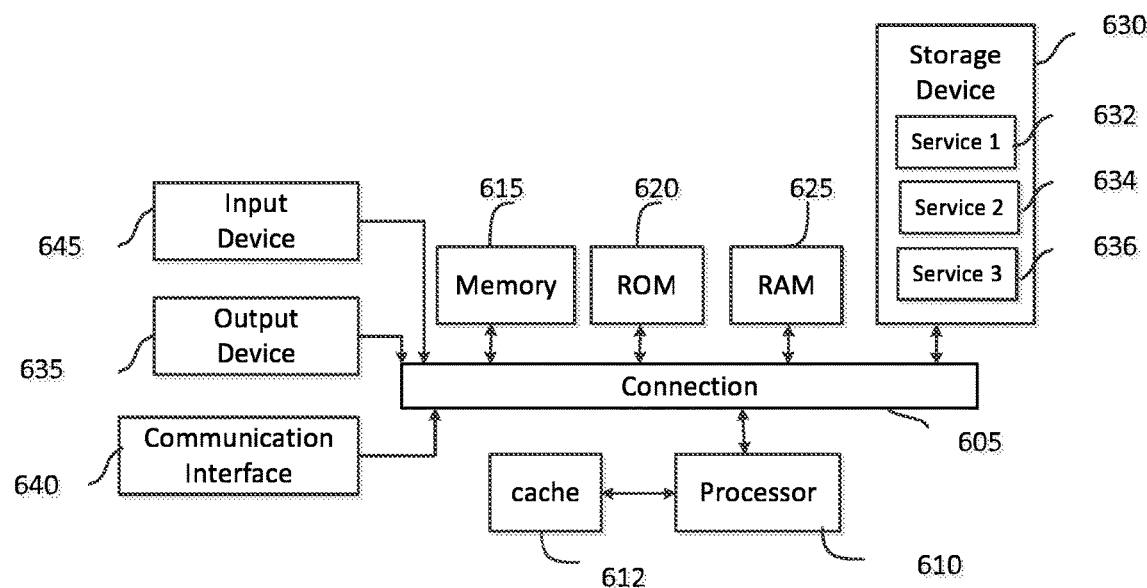
FIG. 6 illustrates an example of a system in accordance with some aspects.

FIG. 6 depicts an example of a computing system 600 in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments computing system 600 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

System 600 includes at least one processing unit (CPU or processor) 610 and connection 605 that couples various system components including system memory 615, such as read only memory (ROM) and random access memory (RAM) to processor 610. Computing system 600 can include a cache of high-speed memory connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

It will be appreciated that computing system 600 can have more than one processor 610, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
    receiving a request from a network client for a resource at a service provider, the request including credentials from the network client and an application program interface (API) scope;
    authenticating the credentials using an identity provider;
    confirming the API scope of the request is identified in one or more API scopes allocated to the network client using an authorization server, the authorization server including a relational database correlating each of a plurality of different network clients with one or more of a plurality of different roles, each of the plurality of different roles with one or more of a plurality of different permissions, and each of the plurality of different permissions with one of a plurality of different API scopes, the plurality of different permissions including rights to install an application and configure application settings;
    requesting an access token from the authorization server;
    receiving the access token from the authorization server;
    requesting the resource from a resource server using the access token;
    validating the access token to confirm whether a token scope of the access token correlates to the API scope of the request; and
    granting the network client access to the resource when the token scope correlates to the API scope of the request.

2. The computer-implemented method of claim 1, further comprising:
    transmitting an authentication response from the identity provider to the service provider when the credentials are authenticated.

3. The computer-implemented method of claim 1, further comprising:
    transmitting the access token from the authorization server to the service provider.

4. The computer-implemented method of claim 1, further comprising:
    transmitting the resource to the service provider.

5. The computer-implemented method of claim 4, further comprising:
    transmitting the resource from the service provider to the network client.

6. The computer-implemented method of claim 1, wherein the plurality of different roles includes an administrator, a customer, and a user.

7. The computer-implemented method of claim 1, wherein the plurality of different permissions includes a right to onboard a user.

8. The computer-implemented method of claim 1, wherein the plurality of different API scopes includes reading data, writing data, and accessing data.

9. A non-transitory computer-readable medium comprising instructions, the instructions, when executed by a computing system, cause the computing system to:
    receive a request for a resource from a client, the request comprising credentials and an application program interface (API) scope;
    authenticate the credentials using an identity provider
    confirm the API scope of the request is identified in one or more API scopes allocated to the client using an authorization server, the authorization server including a relational database correlating each of a plurality of different clients with one or more of a plurality of different roles, each of the plurality different roles with one or more of a plurality of different permissions; and each of the plurality of different permissions with one of a plurality of different API scopes, the plurality of different permissions including rights to install an application and configure application settings;
    request an access token from the authorization server;
    receive the access token from the authorization server;
    request the resource using the access token;
    validate the access token to confirm whether a token scope of the access token correlates to the API scope of the request; and
    grant access to the resource when the token scope correlates to the API scope of the request.

10. The non-transitory computer-readable medium of claim 9, wherein the instructions further cause the computing system to transmit an authentication response from the identity provider when the credentials are authenticated.

11. The non-transitory computer-readable medium of claim 9, wherein the instructions further cause the computing system to transmit the access token from the authorization server to a service provider.

12. The non-transitory computer-readable medium of claim 9, wherein the instructions further cause the computing system to transmit the resource to a service provider.

13. The non-transitory computer-readable medium of claim 9, wherein the plurality of different roles includes an administrator, a customer, and a user.

14. The non-transitory computer-readable medium of claim 9, wherein the plurality of different permissions includes a right to onboard a user.

15. The non-transitory computer-readable medium of claim 9, wherein the plurality of different API scopes includes reading data, writing data, and accessing data.

16. A system comprising:
a processor; and
a non-transitory computer-readable medium storing instructions that, when executed by the system, cause the system to:
receive a request for a resource from a client, the request comprising credentials and an application program interface (API) scope;
authenticate the credentials using an identity provider;
confirm the API scope of the request is identified in one or more API scopes allocated to the client using an authorization server, the authorization server including a relational database correlating each of a plurality of different clients with one or more of a plurality of different roles, each of the plurality of different roles correlated with one or more of a plurality of different permissions, each of the plurality of different permissions with one of a plurality of different API scopes, the plurality of different permissions including rights to install an application and configure application settings;
request an access token;
receive the access token;
request the resource using the access token;
validate the access token to confirm whether a token scope of the access token correlates to the API scope of the request; and
grant access to the resource when the token scope correlates to the API scope of the request.

17. The system of claim 16, wherein the instructions further cause the system to transmit an authentication response from the identity provider when the credentials are authenticated.

18. The system of claim 16, wherein each role of the one or more roles include an administrator, a customer, and a user.

19. The system of claim 16, wherein each permission of the one or more permissions include a right to onboard a user.

20. The system of claim 16, wherein the one or more API scopes include reading data, writing data, and accessing data.

* * * * *